C. A. ROSE.
Cotton-Planter.
No. 30,839.
Patented Dec. 4, 1860.
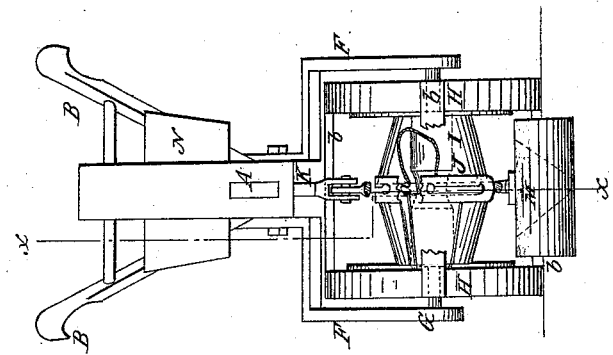
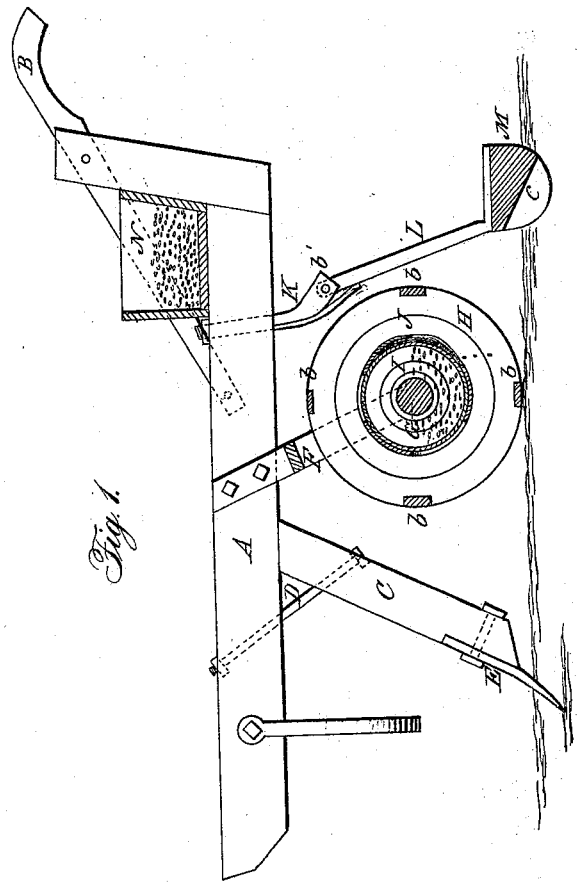
Witnesses:
Inventor:

UNITED STATES PATENT OFFICE.

C. A. ROSE, OF COLUMBIA, ALABAMA.

IMPROVEMENT IN COTTON-SEED PLANTERS.

Specification forming part of Letters Patent No. 30,839, dated December 4, 1860.

*To all whom it may concern:*

Be it known that I, C. A. ROSE, of Columbia, in the county of Henry and State of Alabama, have invented a new and Improved Cotton-Seed Planter; and I do hereby declare that the following is a full, clear, and exact description of the same, reference being had to the annexed drawings, making a part of this specification, in which—

Figure 1 is a side sectional view of my invention, taken in the line $x\,x$, Fig. 2; Fig. 2, a back view of the same in elevation.

Similar letters of reference indicate corresponding parts in the two figures.

This invention consists in the employment or use of a biconical seed-barrel, provided with a perforated strap, in connection with a swinging or rising and falling cover and a furrow-share, all the parts aforesaid being attached to a suitable beam, and so constructed and arranged, as hereinafter fully shown and described, to form a simple and efficient implement for the desired purpose.

To enable those skilled in the art to fully understand and construct my invention, I will proceed to describe it.

A represents the beam of the implement, and B B are handles attached thereto. C is an inclined foot or standard, the upper end of which is attached to the under side of the beam, and is braced by a rod, D. To the lower end of the foot or standard C a furrow-share, E, is attached.

F F represent two bent arms, which are attached one to each side of the beam A. The outer parts of the arms F extend downward in an inclined direction, and their lower ends form bearings for the axle G of two wheels, H H, between which a biconical seed-barrel, I, is placed concentrically, a circumferential space, $a$, being allowed at the center of the seed-barrel, around which a perforated strap, J, is placed. The two wheels H H are connected at their peripheries by traverse bars $b$, and the ends of the seed-barrel are connected to the wheels, so that the former will rotate with the latter. The seed-barrel may be constructed of sheet metal, and the wheels H H may be of wood, and also the beam A and foot C.

To the back part of the beam A, directly behind the seed-barrel I, there is attached a pendant, K, to the lower end of which a rod, L, is attached by a joint, $b'$. To the lower end of a rod, L, a bar or wooden block, M, is attached at right angles. This bar or block has a recess or notch, $c$, made in it, with oblique sides or edges, as shown by the dotted lines in Fig. 2. On the back part of the beam A of the implement there is placed a box, N. This box is designed to contain seed for the attendant to use in hand-sowing around trees, and also to supply the seed-barrel from when required.

As the implement is drawn along the wheels H H rotate the seed-barrel, and the seed is discharged therefrom through the perforations in the strap J. The share E forms the furrows, into which the seed is dropped, a wheel H being at each side of the furrow, and the coverer M covers the seed, the coverer being allowed to rise and fall to conform to the inequality of the surface of the ground in consequence of rod L being connected to the pendant K by a joint, $b'$.

I do not claim separately any of the within-described parts; but

I do claim as new and desire to secure by Letters Patent—

The described arrangement of the share E, bent arms F, axle G, wheels H, bars $b$, hopper I, hinged coverer L M, and seed-box N, the said parts being constructed and combined in the manner and for the purposes set forth.

C. A. ROSE.

Witnesses:
 H. W. B. PRICE,
 RICHD. McGRIFF.